Patented Apr. 11, 1944

2,346,493

UNITED STATES PATENT OFFICE 2,346,493

MANUFACTURE OF CALCIUM CHROMATE

Laurence Francis Le Brocq, Farnham, and Henry George Cole, Farnborough, England

No Drawing. Application August 12, 1943, Serial No. 498,420. In Great Britain October 28, 1941

6 Claims. (Cl. 23—56)

This invention relates to the manufacture of calcium chromate and it has for its object to provide an improved method which is simple and economical to carry out and which results in a product relatively free from deleterious and/or unwanted impurities. In particular the invention sets out to produce calcium chromate in a form which is especially suitable for use as a corrosion inhibitor, e. g. for use in fuel systems. For certain purposes, such for example, as the preparation of corrosion inhibiting compositions and for the preparation of corrosion inhibiting devices or cartridges for use in fuel systems, a calcium chromate of neutral reaction and slight solubility, (e. g. less than 3%) is desirable. It is, moreover, advantageous if the calcium chromate for use, for example, in the cartridges is in the form of relatively coarse particles.

If attempts are made to produce calcium chromate by the addition of calcium hydroxide to chromic acid in the ordinary way the reaction, which is exothermic, is incomplete and the final product is contaminated with calcium bichromate, calcium carbonate and/or calcium hydroxide.

According to the invention, a method of producing chromate by a chromic acid-calcium hydroxide reaction consists in adding to the chromic acid solution a deficiency of calcium hydroxide, thus producing calcium bichromate solution with the evolution of heat, then allowing the solution to cool, then (if its temperature is above 20° C.) additionally cooling it to bring it below 20° C., and then adding further calcium hydroxide, at the same time cooling the reacting substances so that their temperature is maintained below 20° C., so as to produce a solution of a freely soluble but unstable form of calcium chromate. It will be understood that by the term deficiency is meant an amount of calcium hydroxide which is insufficient to convert the whole of the chromic acid to calcium chromate.

It has been found that better results are obtained if the cooling which is applied to the reacting substances maintains their temperature below 5° C. while the reaction is proceeding, and this is explained by the following table:

| Working temperature °C. | 20 | 17 | 10 | 5 |
|---|---|---|---|---|
| Approx. maximum workable concentration (per cent) of unstable calcium chromate solution under plant conditions | 18 | 25 | 29 | 30 |
| Approx. concentration (per cent) of calcium chromate in mother liquor after precipitation of stable CaCrO₄ | 3 | 3 | 3 | 3 |

From the same output it is clear from this table that if the plant be worked at 5° C. it need be only about half the size it would have to be if worked at 20° C. For a single cycle of operations, moreover, 3/18 (16.7%) of the product would be lost at 20° C. whereas only 3/30 (10%) of the product would be lost at 5° C.

The preferred method of producing calcium chromate by a chromic acid-calcium hydroxide reaction consists in adding to chromic acid solution a deficiency of calcium hydroxide, thus producing a stable calcium bichromate solution with the evolution of heat, then allowing this solution to cool, then (if its temperature is above 5° C.) additionally cooling it to bring it below 5° C., then adding further calcium hydroxide, at the same time stirring and cooling the reacting substances so that the latter are kept in circulation and their temperature is maintained below 5° C. The pH value of the unstable calcium chromate solution resulting from the chemical reaction is preferably adjusted to substantially 9.0 (i. e. somewhat alkaline) by the addition of further calcium hydroxide; the resulting solution is then filtered, the filtrate consisting of an unstable and freely soluble form of calcium chromate substantially free from contaminants. If this is allowed to stand at room temperature (say 20° C.), or is warmed, a stable and moderately soluble form of calcium chromate is precipitated from the solution. The precipitate is filtered off, washed and dried, and consists almost entirely of the normal stable form of calcium chromate ($CaCrO_4$) of neutral reaction and of solubility about 3%. The solubility of the precipitate may be further reduced, if desired, by baking. The chromate according to the invention can be produced in various solubilities, for example, 0.60%, 1.25% and 5.80% of which the intermediate figure provides a chromate satisfactory for general use and at the same time being sufficiently soluble to overcome or prevent initial corrosion arising before the protective properties of the chromate become effective. Generally the calcium chromate which is produced by the improved process is in the form of a coarse powder, which is desirable when the material is used for inhibiting corrosion in tanks, pipe systems and the like. The filtrate may be used for the preparation of further quantities of calcium bichromate solution.

*Example*

An approximately 60% solution of calcium bichromate is made by adding 37 grammes of calcium hydroxide to a solution of 100 grammes of chromic anhydride ($CrO_3$) in 200 cubic centimetres of water.

The solution is cooled below 5° C. by means of any suitable cooling apparatus and a further 37 grammes of calcium hydroxide is added in sufficient water (about 400 cubic centimetres) to give an unstable 25% solution of calcium chromate. During this latter addition of the calcium hydroxide the temperature of the mixture is maintained below 5° C. by the cooling apparatus. A slight excess of calcium hydroxide is then added until a small portion of the solution just gives a pink colour with phenol-phthalein. The solution is then filtered to remove insoluble impurities, and brought to the boil, thus precipitating the normal stable calcium chromate. The calcium chromate is filtered off, washed and dried. Yield 78%. The solubility of the material may be reduced by baking, and temperatures up to 600° C. may be used for this purpose.

The example shows the advantage of using a low temperature. In this example it is seen that a 25% solution of the unstable form of calcium chromate can be manipulated without danger of premature disposition of the normal form of the salt. During the production of calcium dichromate a considerable amount of heat is evolved, and when the calcium hydroxide is added in a single stage, as is already known, this heat has to be removed by the cooling plant to keep the reactants cool. When using the improved method, a previously prepared calcium bichromate solution which has cooled during storage may be used.

We claim:

1. A method of producing calcium chromate by a chromic acid-calcium hydroxide reaction, consisting in adding to the chromic acid solution a quantity of calcium hydroxide less than is stoichiometrically required to convert the whole of the chromic acid to calcium chromate and so as to form a solution containing calcium dichromate, cooling said solution below 20° C., then adding further calcium hydroxide so as to produce a solution containing a freely soluble calcium chromate, and maintaining said solution during said further addition and completion of the reaction at a temperature below 20 C.

2. A method as claimed in claim 1, wherein, during the reaction, the reacting substances are maintained in a state of circulation.

3. A method of producing calcium chromate by a chromic acid-calcium hydroxide reaction, consisting in adding to the chromic acid solution a quantity of calcium hydroxide less than is stoichiometrically required to convert the whole of the chromic acid to calcium chromate and so as to form a solution containing calcium dichromate, cooling said solution below 5° C., then adding further calcium hydroxide so as to produce a solution containing a freely soluble calcium chromate, and stirring and maintaining said solution during said further addition and completion of the reaction at a temperature below 5° C.

4. A method as claimed in claim 1 wherein the pH value of the calcium chromate solution resulting from the chemical reaction is adjusted to substantially 9.0 by the addition of further calcium hydroxide.

5. A method as claimed in claim 1 wherein the resulting cool solution, which comprises freely soluble but unstable calcium chromate, is filtered to remove solid impurities and is allowed to stand at a temperature high enough to precipitate normal slightly soluble calcium chromate.

6. A method as claimed in claim 1, wherein the resulting cool solution, which comprises freely soluble but unstable calcium chromate, is filtered to remove solid impurities and is allowed to stand at a temperature high enough to precipitate normal slightly soluble calcium chromate and the precipitated calcium chromate is dried and is then baked at 400–600° C., whereby the water-solubility of the particles is reduced.

LAURENCE FRANCIS LE BROCQ.
HENRY GEORGE COLE.